(12) United States Patent
Watson

(10) Patent No.: US 7,607,674 B2
(45) Date of Patent: Oct. 27, 2009

(54) RETRACTABLE SIDESTEP

(75) Inventor: Brad E. Watson, Sharon (CA)

(73) Assignee: Magna International (CA)

( * ) Notice: Subject to any disclaimer, the term of this patent is extended or adjusted under 35 U.S.C. 154(b) by 0 days.

(21) Appl. No.: 12/077,587

(22) Filed: Mar. 20, 2008

(65) Prior Publication Data

US 2008/0246244 A1    Oct. 9, 2008

Related U.S. Application Data

(63) Continuation of application No. 11/236,475, filed on Sep. 27, 2005, now Pat. No. 7,413,205.

(51) Int. Cl.
*B60R 3/00* (2006.01)
(52) U.S. Cl. .................. 280/166; 280/163; 280/169
(58) Field of Classification Search .......... 280/163–166
See application file for complete search history.

(56) References Cited

U.S. PATENT DOCUMENTS

| | | | | |
|---|---|---|---|---|
| 1,456,780 A | * | 5/1923 | Kermode | 280/164.1 |
| 1,515,449 A | * | 11/1924 | Vose | 280/169 |
| 1,542,342 A | * | 6/1925 | Doctor | 280/164.1 |
| 1,633,427 A | | 6/1927 | Wiese | |
| 1,982,748 A | | 12/1934 | Lamonica et al. | |
| 2,062,026 A | | 11/1936 | Hassel | |
| 2,206,744 A | | 7/1940 | Loecher | |
| 2,818,594 A | | 1/1958 | Dawkins | |
| 5,195,609 A | | 3/1993 | Ham et al. | |
| 5,697,626 A | * | 12/1997 | McDaniel et al. | 280/166 |
| 5,806,869 A | | 9/1998 | Richards | |
| 6,036,208 A | | 3/2000 | Frerichs | |
| 6,149,172 A | | 11/2000 | Pascoe et al. | |
| 6,325,397 B1 | | 12/2001 | Pascoe et al. | |
| 6,375,207 B1 | | 4/2002 | Dean et al. | |
| 6,435,534 B1 | * | 8/2002 | Stone | 280/163 |
| 6,533,303 B1 | * | 3/2003 | Watson | 280/166 |
| 6,676,223 B2 | * | 1/2004 | Kolpasky | 301/5.1 |
| 6,709,137 B1 | | 3/2004 | Glovak et al. | |
| 6,942,233 B2 | * | 9/2005 | Leitner et al. | 280/166 |
| 6,971,657 B2 | | 12/2005 | King et al. | |
| 7,086,656 B2 | * | 8/2006 | Kolpasky et al. | 280/164.1 |
| 2003/0094781 A1 | | 5/2003 | Jaramillo et al. | |
| 2003/0132595 A1 | | 7/2003 | Fabiano et al. | |
| 2004/0084868 A1 | | 5/2004 | Leitner et al. | |
| 2004/0100063 A1 | | 5/2004 | Henderson et al. | |
| 2005/0179226 A1 | | 8/2005 | Kolpasky et al. | |

\* cited by examiner

*Primary Examiner*—Christopher P Ellis
*Assistant Examiner*—Katy Meyer
(74) *Attorney, Agent, or Firm*—Warn Partners, P.C.; Marc Luddy

(57) ABSTRACT

A manually retractable side step assembly for a vehicle includes a rotatable step having a latch mechanism and a spring system that work in concert to rotate the step from a stowed position to a deployed position. In a stowed position, the step is in line with the running board of the vehicle. However, depressing a release button automatically rotates the step 180°, thus exposing an enlarged step area for providing ease of access to a roof rack on a minivan, SUV, or sport wagon, or if used with a pick-up truck, ease of access to a toolbox that is located in the rear of the truck.

17 Claims, 5 Drawing Sheets

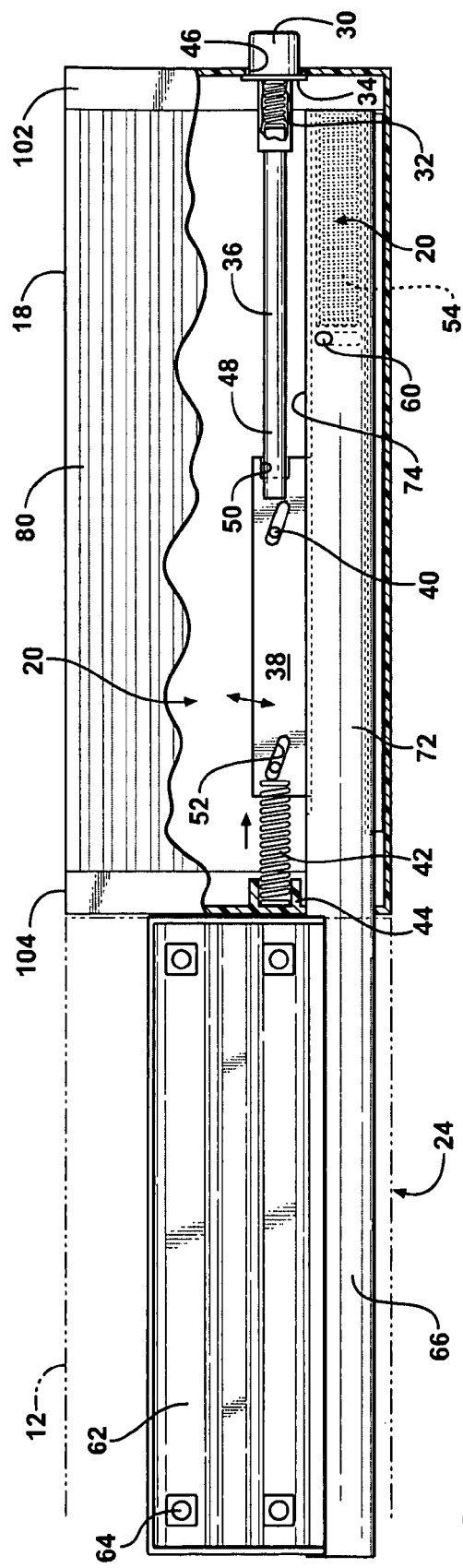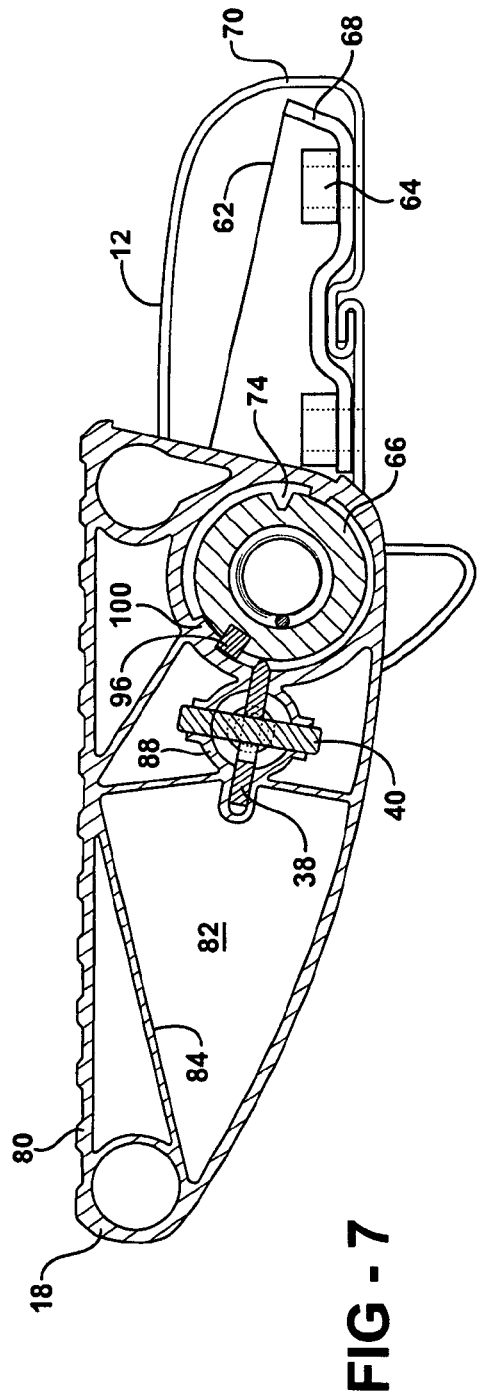

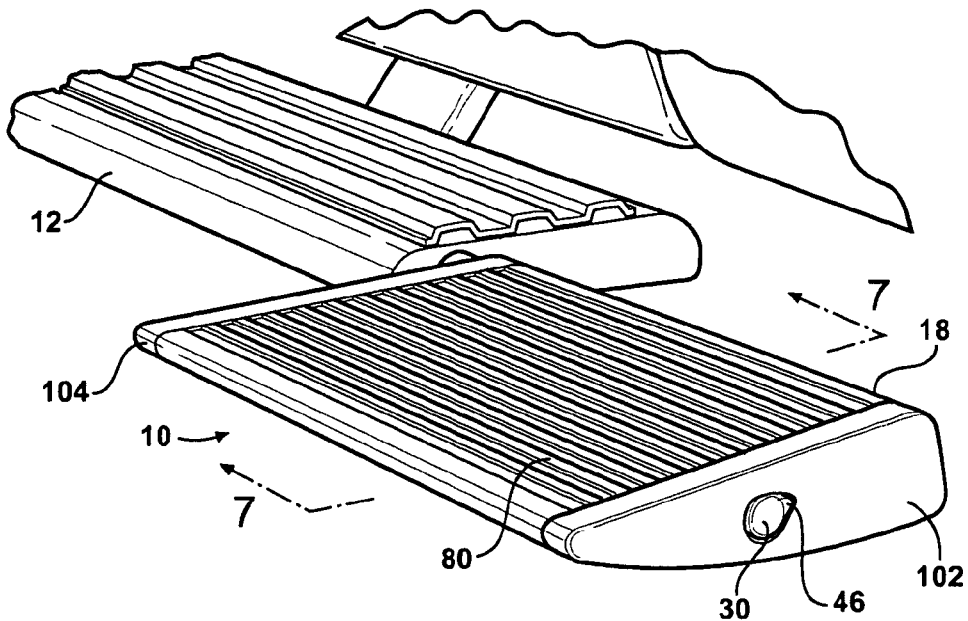
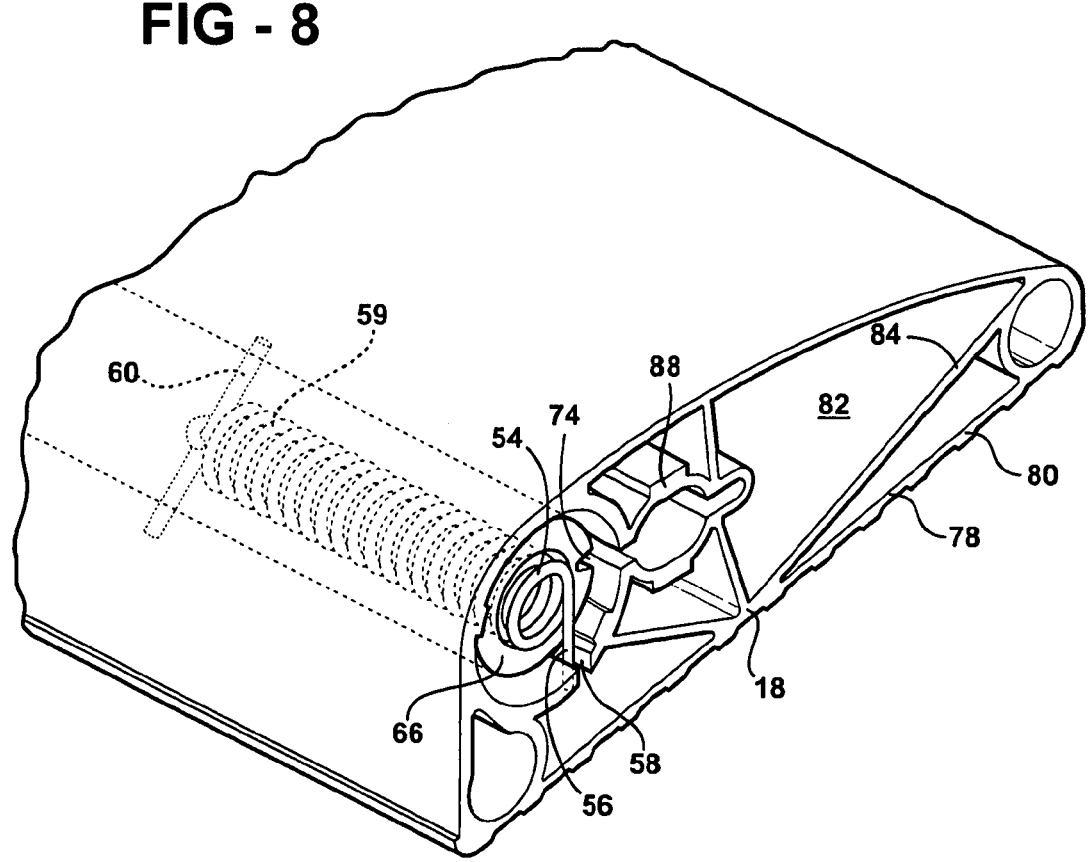

RETRACTABLE SIDESTEP

This application is a continuation of U.S. patent application Ser. No. 11/236,475 filed on Sep. 27, 2005. The disclosure of the above application is incorporated herein by reference.

FIELD OF THE INVENTION

The subject of the present invention relates to a sidestep assembly for a vehicle for enabling a user to easily access a toolbox in the bed of a pick-up truck. The invention also relates to a sidestep for accessing a roof rack on a SUV, minivan, or sport wagon, or even bikes, etc., that are mounted on the top of the vehicle.

BACKGROUND AND SUMMARY OF THE INVENTION

It is common to provide running boards on pick-up trucks, sport utility vehicles, and other types of vehicles where it is desirable to provide the user with ease of entry into the cabin of the vehicle. It is also advantageous to provide a sidestep near the rear of the running board that assists in easy access to a toolbox that may be located in the bed of the pick-up truck. Traditionally, running boards are located inward towards the side of the vehicle. The problem though is that they do not provide a solid surface for the user to stand on while accessing the toolbox.

It is also common to provide roof racks on minivans, SUVs and sport wagons and to secure bicycles, skis, kayaks, canoes, boats, or even sport boxes to the roof of these vehicles. A recurring problem though is accessing these items once they are secured to the vehicle. Traditional running boards however, don't provide easy access to the roof or anything secured thereto.

It is known to provide steps to provide access to a tailgate area of a pick-up truck. However, currently there are no retractable step products that are simple in design yet provide ease of access to the toolbox that is located in the bed of a truck. Rear access via the tailgate is often awkward and more time consuming if quick and simple access is required to the side of a box for replacement of tools. Further, toolboxes are generally located in the front area of the truck bed and, because typical running boards do not extend rearward enough, they do not provide ease of access to the forward part of a truck bed. Thus, it would be desirable to provide a sidestep located near the front end of the truck bed, or where the toolbox is located. It would also be desirable to provide an after market sidestep that can be connected to an existing running board. It would also be desirable to provide a sidestep as an OEM product for use in connection with an existing running board. It would also be desirable to provide an extended tube style board with a rotatable wider rear section that when rotated out, provides a wider step surface that is positioned further outward than the typical tube style running board. It is also desirable to provide a sidestep that provides ample foot contact area as well as step height so as to meet typical OEM requirements for ergonomics.

It is also desirable to provide a sidestep that provides easy access to a toolbox that is simple in design, easy to operate, and has minimal working components, and is economic and ergonomic. Accordingly, it is an object of the present invention to provide an improved retractable sidestep which overcomes the above referenced disadvantages.

It is another object of the present invention to provide an improved sidestep that can rotate out from a stowed position to a deployed position thus allowing the user to have an improved standing surface when accessing the top of the roof or a toolbox that is located in the bed of a truck.

According to one aspect of the present invention, there is provided a sidestep assembly comprised of a step positioned adjacent to the running board. A latch mechanism is provided that is located within the step and said mechanism is operable to lock the step in a stowed position or to be released to allow the step to be repositioned to a deployed position. The latch mechanism includes a release button, a push rod, a latch plate, a latch spring and a set of guide pins. The sidestep assembly further includes a spring deployment mechanism having an elongated tube with a spring positioned therein. The spring acts to rotate the step once the latch mechanism has been released, thus allowing the step to rotate out into a useable position for the user to stand on and to access a toolbox. A support tube assembly is part of the running board of the vehicle and includes a mounting bracket that secures the elongated tube in place relative to the running board. This allows the step mechanism to pivot relative to the elongated tube, between a stowed position and a deployed position.

The step assembly can be easily deployed by depressing the release button, thus allowing the step to rotate outward automatically to a deployed position where a mechanism stop locks it in place. After the user is done using the step, the step can be rotated via hand or foot means to rotate the step to the stowed position, where it automatically locks in place.

BRIEF DESCRIPTION OF THE DRAWINGS

Further areas of applicability of the present invention will become apparent from a detailed description hereafter. It will be understood that the detailed description and specific examples come out while indicating preferred embodiments of the invention, are intended for purposes of illustration only, since the various changes and modifications within the spirit and scope of the invention will become apparent to those skilled in the art from this detailed description.

FIG. 3 is a plan view of the FIG. 2 sidestep assembly, illustrating the sidestep assembly relative to the running board of a vehicle;

FIG. 6 is a perspective view of the sidestep assembly shown in the deployed position, relative to the running board of the vehicle;

FIG. 7 is a section cut taken from the direction of arrow 7-7 from FIG. 6, showing the step assembly in its deployed position relative to the running board; and FIG. 8 is a perspective view of the step assembly shown in the stowed position, illustrating the spring located within the support tube, which is located within the extruded step.

DETAILED DESCRIPTION OF THE PREFERRED EMBODIMENT

Referring to the figures, where like numerals indicate like or corresponding parts throughout the various figures, a side step assembly 10 is shown adjacent to a running board 12 that is in turn affixed to a vehicle 14. A toolbox 16 is shown located in the forward edge of a truck bed. The purpose of the present invention is to provide ease of access by a user to the toolbox 16 via the use of a novel sidestep assembly 10. Alternatively, the step assembly 10 can provide ease of access to a roof rack where sporting equipment can be secured. The vehicle 14 can be a truck, minivan, SUV, sport wagon or any vehicle where it is desirable to access something elevated on the vehicle 14. For illustrative purposes only, the following description will relate to accessing a toolbox in a pick-up truck.

Figure 1:
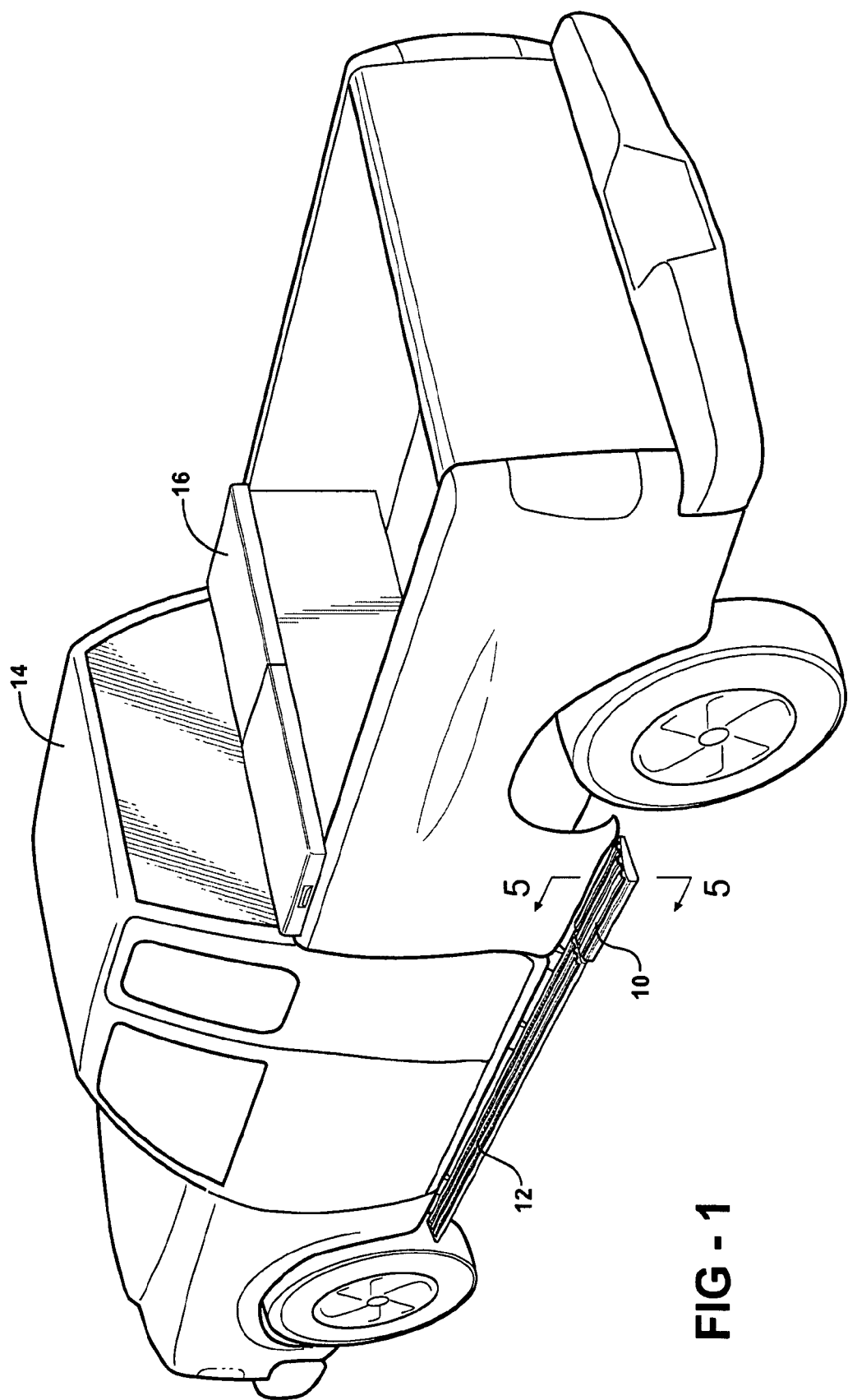
FIG. 1 is a perspective view of a vehicle illustrating the sidestep assembly.
Figure 2:
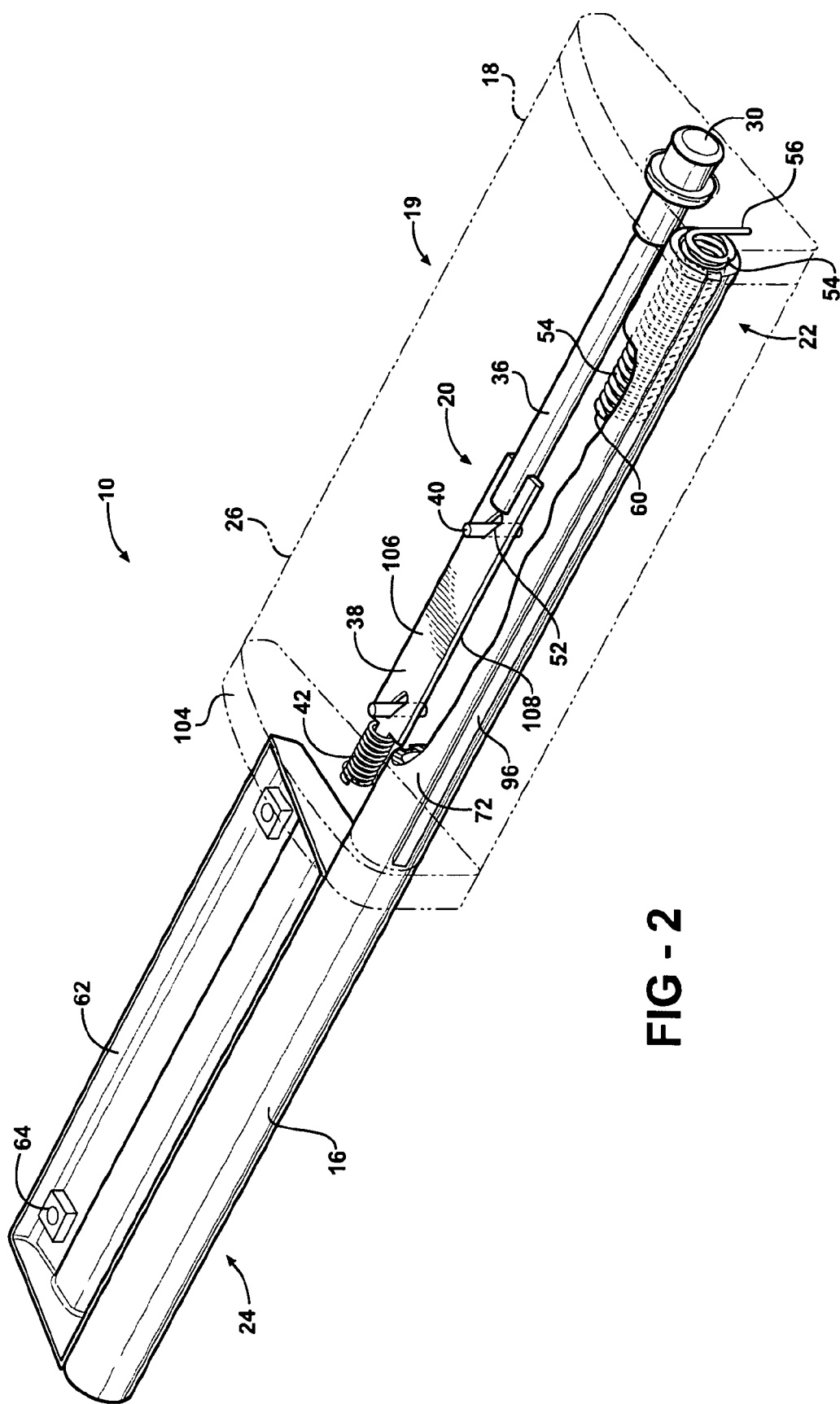
FIG. 2 is a perspective view of the sidestep assembly shown in a stowed position, with the step shown in phantom.
Figure 4:
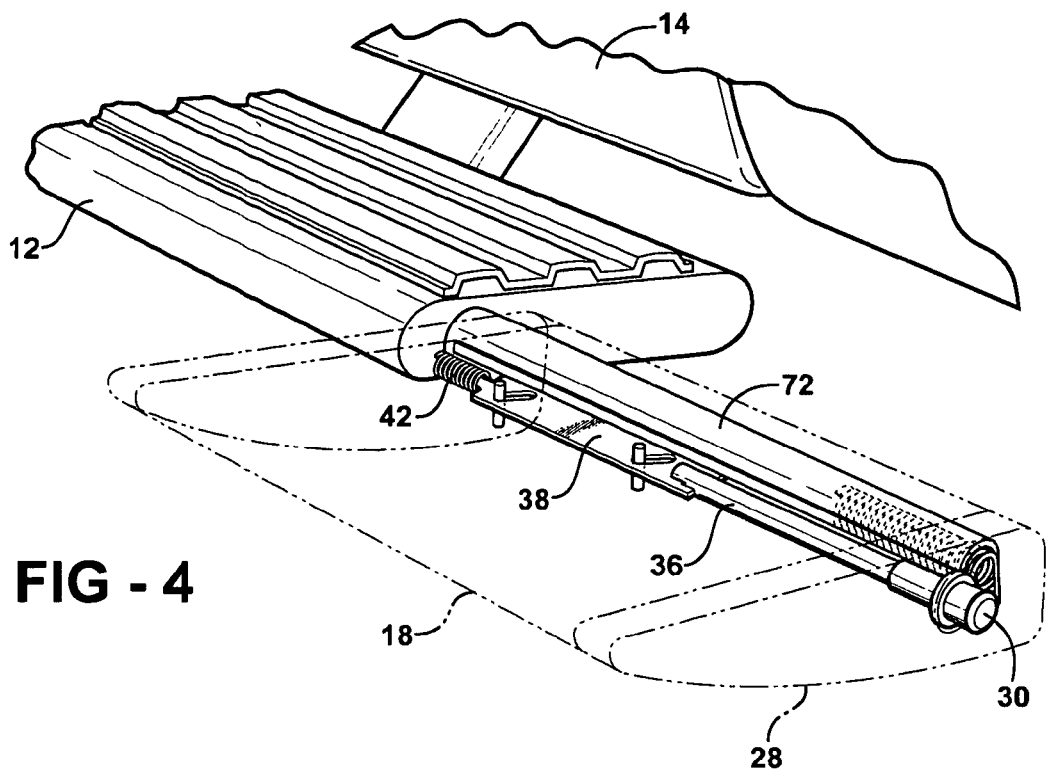
FIG. 4 is a perspective view of the sidestep assembly shown in the deployed position, with the sidestep extrusion shown in phantom.

The sidestep assembly 10 is stream lined with the running board 12 to provide an aesthetically pleasing design. With reference to FIG. 2, the sidestep assembly 10 is shown in the stowed position and is comprised of a sidestep extrusion 18, a latch system 20, a spring deploy system 22, and a support tube assembly 24. These components work in unison to provide a rotatable step 19 that can rotate between a stowed position 26 or a deployed position 28 (FIG. 4). Once in the deployed position 28, the user has an extended surface that protrudes away from the side panel of the truck bed, thus providing an improved solid surface to stand on when accessing the toolbox 16.

With reference to FIG. 3, the latch system 20 is comprised of a latch release button 30, a seal spring 32, a button seal 34, a latch push rod 36, a latch plate 38, a set of latch guide pins 40, a latch spring 42, and a spring retainer 44. The purpose of the latch system 20 is to maintain the sidestep 19 in the closed position during transport, but to be disengaged when the operator needs to access a toolbox.

The latch release button 30 extends through a hole 46 that is located in the end cap 102 of the sidestep extrusion 18. The seal spring 32 biases the button seal 34 closed to keep debris out of the interior of the extrusion. One end 48 of the push rod 36 engages a "U" shaped slot 50 located in the latch plate 38. They are affixed via conventional means. The latch plate 38 further includes a pair of diagonally spaced slots 52 that are operable to receive latch guide pins 40 in spaced apart locations. The latch spring 42 engages the other end of the latch plate 38 causing the latch plate to be biased inward towards a slot running the axial length of the support tube. One end of the latch spring 42 is cradled within the spring retainer 44 so as to maintain position of the spring. The retainer 44 is secured to the end cap.

With continued reference to FIGS. 2, 3, and 8, the spring deployment system 22 is comprised of a deploy spring 54 that is positioned within the support tube. The deploy spring has an end 56 that engages a notch 58 that is located within a cylindrically shaped profile 86 of the extrusion 18. The opposite end 59 of the deploy spring 54 is secured to a spring anchor pin 60 thus allowing the torsion spring 54 to impart rotation to the step 19 once the latch system 20 is released via latch release button 30.

With reference to FIGS. 2, 3, and 7, the support tube assembly 24 is comprised of a mounting bracket 62, which is secured via weld nuts 64 to a conventional running board 12, which in turn is affixed to the vehicle 14 via conventional methods. The support tube assembly 24 further includes a support tube 66 that is an integral part of the mounting bracket 62. The mounting bracket 62 further having an inner extruded wall 68 that is operable to engage the outer extruded wall 70 of the running board 12. Thus, the mounting bracket 62 fits within the running board 12 and forms an integral part located within the running board 12 that is not viewable to the user. It will be appreciated that the mounting bracket 62 could be connected to a minivan, SUV, or sport wagon by various means so as to provide a side step assembly that offers access to the top of each type of vehicle.

The support tube 66 extends the entire length of the mounting bracket 62, and through a substantial portion of the sidestep extrusion 18. The portion 72 of this support tube that extends within the step extrusion 18, acts as a pivot point for the step 19 to rotate there about, between the stowed position (shown in FIG. 2) and the deployed position (shown in FIG. 4). This allows the step assembly 10 to rotate approximately 180 degrees whereby the step is ergonomically aligned with the running board 12 when in the stowed position, yet can be rotated outwardly away from the body of the vehicle, to the deployed position. The support tube is preferably made of steel as are the components of the mounting bracket 62, each of which having sufficient strength to support a user.

Figure 5:
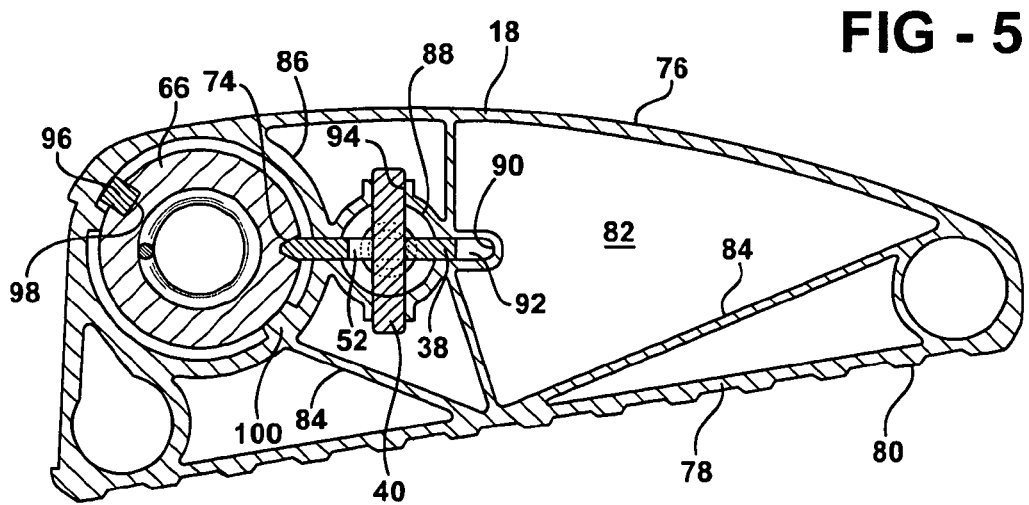
FIG. 5 is a side view section of 5-5 taken from FIG. 1 showing the sidestep assembly in the stowed position, further illustrating the support tube relative to the extruded step.

With reference to FIGS. 5, 7, and 8, the support tube 66 has an axially extending slot 74 extending the majority of the tube 66 for receiving an edge 108 of the latch plate 38. This construction creates a mechanical stop for the sidestep 19 to be maintained in the stowed position while the vehicle is traveling down the road.

With reference now to FIGS. 5, 7, and 8, the components of the sidestep extrusion 18 will now be discussed. The sidestep extrusion 18 is comprised of a curved outer wall 76 that acts as the top surface when the step in the stowed position. A lower wall 78 has a textured grip surface 80 for user to stand on once in the deployed position. The interior of the step extrusion 18 has an interior cavity 82 with support channels 84 extending throughout. The support channels 84 provide rigidity to the structure, which is preferably an extruded aluminum design. It will be appreciated that the step extrusion 18 can be made of other methods and other materials.

The interior cavity 82 of the step extrusion 18 further includes a cylindrically shaped profile 86 that runs the entire length of the step, that is operable to receive the support tube 66. There is sufficient clearance between the support tube 66 and the extruded portion 86, so as to allow for a rotatable fit there between. The cavity 82 further includes a circular profile 88 adjacent to and connected with the cylindrically shaped profile 86. The circular profile 88 extends essentially the entire length of the sidestep, and has a horizontally slotted portion or groove 90 that is operable to receive the latch plate 38. There is sufficient clearance 92 within the groove 90 to allow the latch plate to traverse therein relative to the support tube 66. This allows the latch plate 38 to engage (as shown in FIG. 5) the support tube 66, or to disengage and pull away from the support tube 66 (as shown in FIG. 7). The circular profile 88 further includes a vertically spaced opening 94 that is operable to receive and secure in place the latch guide pins 40. The latch guide pins 40 extend through the latch plate 30 and allow the plate to traverse outward and away from the support tube 66, when the latch release button 30 is pressed.

With reference to FIG. 7, a deploy stop key 96 is positioned within a groove 98 of the support tube 66. The key 96 engages a deploy stop 100 integral with the cylindrical portion 86 when the sidestep rotates to a deployed position as shown in FIG. 7. This mechanical arrangement provides a stop for the step to be firmly located in place. It will be appreciated, that others stop designs can be provided, and are contemplated to be well within the scope of the present invention.

In addition to the step extrusion 18, the step 19 further includes an outer end cap 102 and an inner end cap 104. The caps serve to close off the interior space of the cavity 82, keeping the interior components thereof free of material. The end caps are preferably made of the same material as the step 18. The caps are secured to the step extrusion 18 by conventional means.

It will further be appreciated that the latch system 20 be comprised of sufficiently rigid materials to provide structural integrity for this particular application. Likewise, the spring deployment system 22 is comprised of a sufficiently strong torsional spring 54 as to allow proper rotational movement of the step 19.

A discussion of the operation of the step assembly 10 will now be presented. With reference to FIGS. 2, 5, and 7, the assembly 10 is shown in the stowed position (FIG. 2) which is its normal operating condition when the vehicle is traveling down the road. Once the vehicle stops, the operator can deploy the sidestep by depressing the latch release button 30. Pressing the latch release button 30 inward causes the push rod 36 to move inward thus causing the latch plate 38 to traverse outward in the direction of arrow 106. This action induces edge 108 of the latch plate to disengage from the slot 74 located in the outer perimeter of the support tube 66. Once the latch plate 38 fully disengages the slot 74, the spring deployment system 22 then imparts rotation in a counter clockwise direction thus allowing the step 19 to advance towards a deployed position as shown in FIGS. 4 and 7. The step 19 continues to rotate in a counter clockwise manner until the deploy stop key 96 engages deploy stop 100. This provides a firm mechanical stop and a rigid connection between the running board 12 and the sidestep 19 so as to provide a firm stepping area.

When it is desirable to then return the step 19 to a stowed position, the operator merely rotates the step in a clockwise direction thus loading the spring and further allowing the edge 108 of the latch plate 38 to reengage the slot 74 located in the support tube 66. The step is now in a secure stowed position which can be re-deployed later.

It will be appreciated that other variations of the sidestep assembly 10 can be utilized. For example, the step assembly 10 could be secured to a structure other than a running board, while providing easy access to the roof of a vehicle. The same rotatable feature would be employed, thus providing stowed and deployed positions. Such variations are not to be regarded as a departure from the spirit and scope of the invention.

What is claimed is:

1. A side step assembly comprising:
    a running board connected to a vehicle;
    a mounting bracket connectable to said running board;
    a support tube extending from said mounting bracket beyond one side of said running board; and
    a rotatable step having a step surface and a streamline surface, wherein said rotatable step selectively rotates about said support tube between a position adjacent said mounting bracket such that said streamline surface of said rotatable step is aligned with said running board, to a deployed position wherein said step surface of said rotatable step is offset from said running board.

2. The side step assembly of claim 1, wherein said rotatable step is configured to rotate clockwise or counter-clockwise with respect to said running board depending on whether the side step assembly is on the left or right side of said vehicle.

3. The side step assembly of claim 1, wherein said rotatable step is configured to rotate 180 degrees or less when moving from a position adjacent said running board to said deployed position.

4. The side step assembly of claim 1 further comprising a latch system that is housed within said rotatable step, the latch system being operable to control the selective deployment of said rotatable step from said position adjacent said mounting bracket to said deployed position.

5. The side step assembly of claim 4, wherein said latch system further includes a release button that is depressed to selectively allow deployment of said rotatable step.

6. The side step assembly of claim 1 further comprising a spring deployment system housed within said support tube, the spring deployment system being operable to bias said rotatable step assembly towards said deployed position.

7. The side step assembly of claim 6, wherein the spring deployment system further includes a spring operable for rotatably biasing the rotatable step to the deployed position.

8. The side step assembly of claim 1, wherein said rotatable step includes interior channels for receiving said support tube and an inner end cap and outer end cap operable to prevent contaminants from entering said interior channels of said rotatable step.

9. The side step assembly of claim 1, wherein the elongated support tube includes a stop member that is operable to engage an internal wall of said rotatable step when said rotatable step is moved to said deployed position.

10. A side step assembly for a vehicle comprising:
    a running board connected to a vehicle wherein said running board has an upwardly facing surface and a downwardly facing surface;
    a mounting bracket connectable to said downwardly facing surface of said running board;
    a support tube extending from said mounting bracket beyond at least one side of said running board; and
    a rotatable step having a streamline surface and a step surface, wherein said rotatable step is rotatably connected to said support tube such that said rotatable step rotates about said support tube, wherein said rotatable step rotates between a position adjacent said running board where said streamline surface is contiguous with said upwardly facing surface of said running board, to a deployed position where said step surface of said rotatable step faces upward and is offset with respect to said upwardly facing surface of said running board.

11. The side step assembly for a vehicle of claim 10, wherein said rotatable step is configured to rotate clockwise or counter-clockwise with respect to said mounting bracket depending upon whether the side step assembly is on the left side or right side of said vehicle.

12. The side step assembly for a vehicle of claim 10, wherein said rotatable step is configured to rotate 180 degrees or less.

13. The side step assembly of claim 10 further comprising a latch system that is housed within said rotatable step, the latch system being operable to control the selective deployment of said rotatable step from said position adjacent said mounting bracket to said deployed position.

14. The side step assembly of claim 10 further comprising a spring deployment system housed within said support tube, the spring deployment system being operable to bias said rotatable step assembly towards said deployed position.

15. The side step assembly of claim 14, wherein the spring deployment system further includes a spring operable for rotatably biasing the rotatable step to the deployed position.

16. The side step assembly of claim 10, wherein said rotatable step includes interior channels for receiving said support tube and an inner end cap and outer end cap operable to prevent contaminants from entering said interior channels of said rotatable step.

17. The side step assembly of claim 10, wherein the elongated support tube includes a stop member that is operable to engage an internal wall of said rotatable step when said rotatable step is moved to said deployed position.

* * * * *